United States Patent [19]
Campbell

[11] 3,960,061
[45] June 1, 1976

[54] MOUNTING ARRANGEMENT FOR A HYDRAULIC MOTOR

[75] Inventor: John J. Campbell, Decatur, Ill.

[73] Assignee: Caterpillar Tractor Co., Peoria, Ill.

[22] Filed: Mar. 27, 1975

[21] Appl. No.: 562,612

[52] U.S. Cl. ................................................ 91/506
[51] Int. Cl.² ...................... F01B 13/04; B60K 3/00
[58] Field of Search ..... 180/66 F; 91/499, 504–506; 92/121, 122

[56] References Cited
UNITED STATES PATENTS

| | | | |
|---|---|---|---|
| 2,430,528 | 11/1947 | Moon | 91/499 |
| 3,126,835 | 3/1964 | Kline | 91/507 |
| 3,221,660 | 12/1965 | D'Amato | 417/222 |

FOREIGN PATENTS OR APPLICATIONS

| | | | |
|---|---|---|---|
| 1,937,659 | 1/1971 | Germany | 91/499 |
| 2,152,568 | 4/1972 | Germany | 91/499 |

Primary Examiner—William L. Freeh
Attorney, Agent, or Firm—John W. Grant

[57] ABSTRACT

A mounting arrangement for a hydraulic motor having a pivotal swash plate and an axially extending drive shaft includes a support structure having an open ended bore formed therein to receive the hydraulic motor and a mounting bracket journalled to the drive shaft of the hydraulic motor. The mounting bracket has a pair of spaced apart lugs which extend toward the hydraulic motor and pivotally engage the swash plate, and an annular pilot portion disposed coaxial with the drive shaft and piloted into a pilot bore formed in an end wall of the support structure opposite to the open end of the bore with the mounting bracket being secured to the end wall.

8 Claims, 3 Drawing Figures

MOUNTING ARRANGEMENT FOR A HYDRAULIC MOTOR

BACKGROUND OF THE INVENTION

Many vehicles are provided with auxiliary drive devices on the front wheels to provide increased traction under certain operating conditions. The recent trend has been toward the utilization of variable displacement hydraulic motors as the auxiliary drive devices. Generally, such front wheel drive arrangements are offered as optional features to a basic vehicle and ideally identical front wheel support structures are used on both the basic vehicles and those equipped with the auxiliary front wheel drive. One of the problems encountered with this approach has been that of providing a mounting arrangement which does not require extensive additional machining or elements added to the basic wheel structure so that the same basic wheel support structure design may be economically used on the basic machine.

Another problem encountered is that heretofore the hydraulic motor of the variable displacement overcenter swash plate type and its attendant shaft support bearings and seals have installed in the wheel support structure in piecemeal fashion making the initial assembly and subsequent servicing of the hydraulic motor extremely difficult.

OBJECTS OF THE INVENTION

Accordingly, an object of this invention is to provide an improved mounting arrangement for a hydraulic motor which permits a hydraulic motor and its attendant mounting members to be assembled and installed within a support structure as a unit.

Another object of this invention is to provide such an improved mounting arrangement which minimizes the number of additional elements added to the support structure so that a common basic support structure design may be economically employed with or without the hydraulic motor mounted thereto as an auxiliary device.

Other objects and advantages of the present invention will become more readily apparent upon reference to the accompanying drawings and following description.

DESCRIPTION OF THE PREFERRED EMBODIMENT

Figure 1:
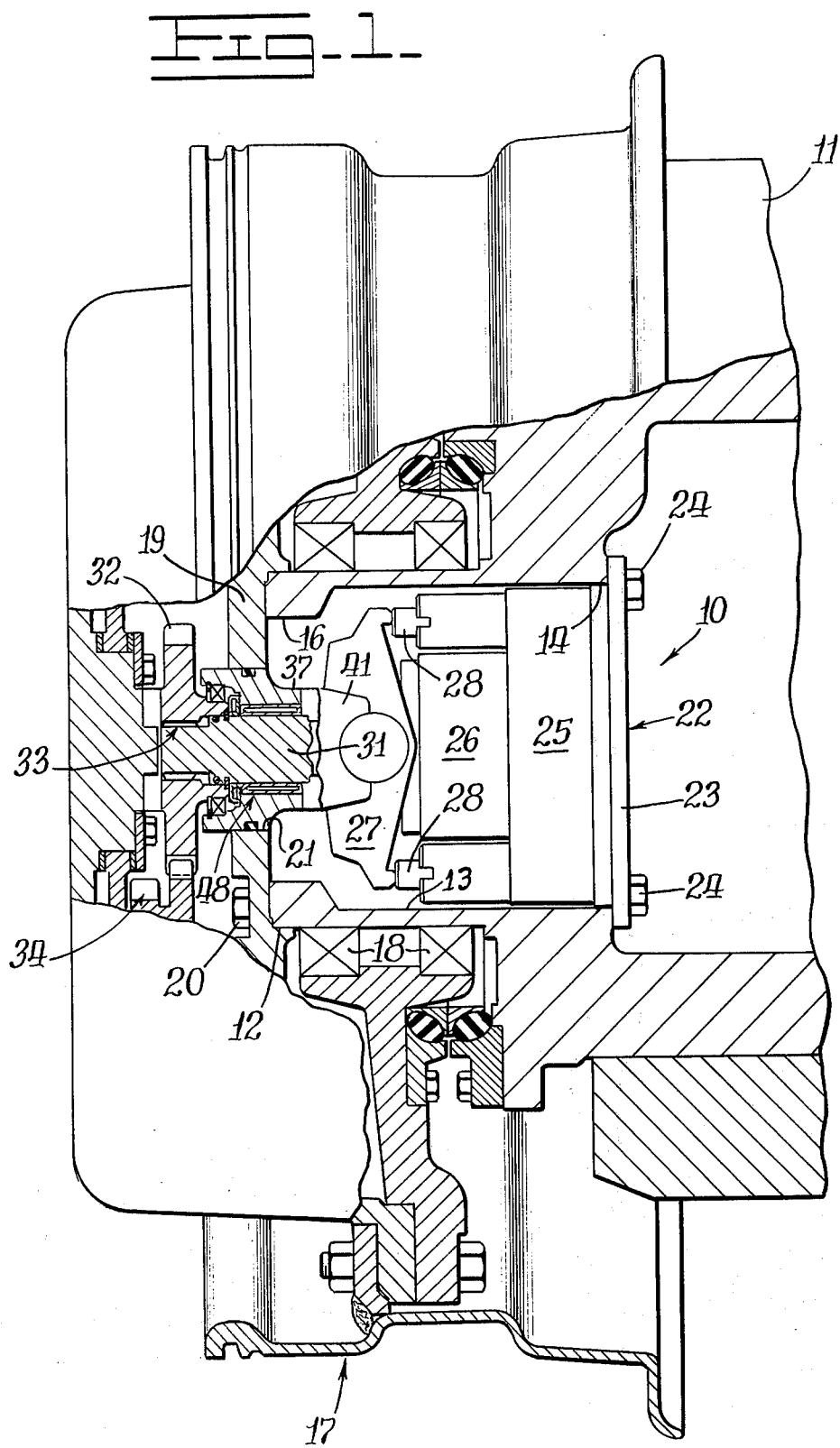
FIG. 1 is a longitudinal sectional view through a mounting arrangement for a hydraulic motor embodying the principles of the present invention in association with a wheel structure.
Figure 2:
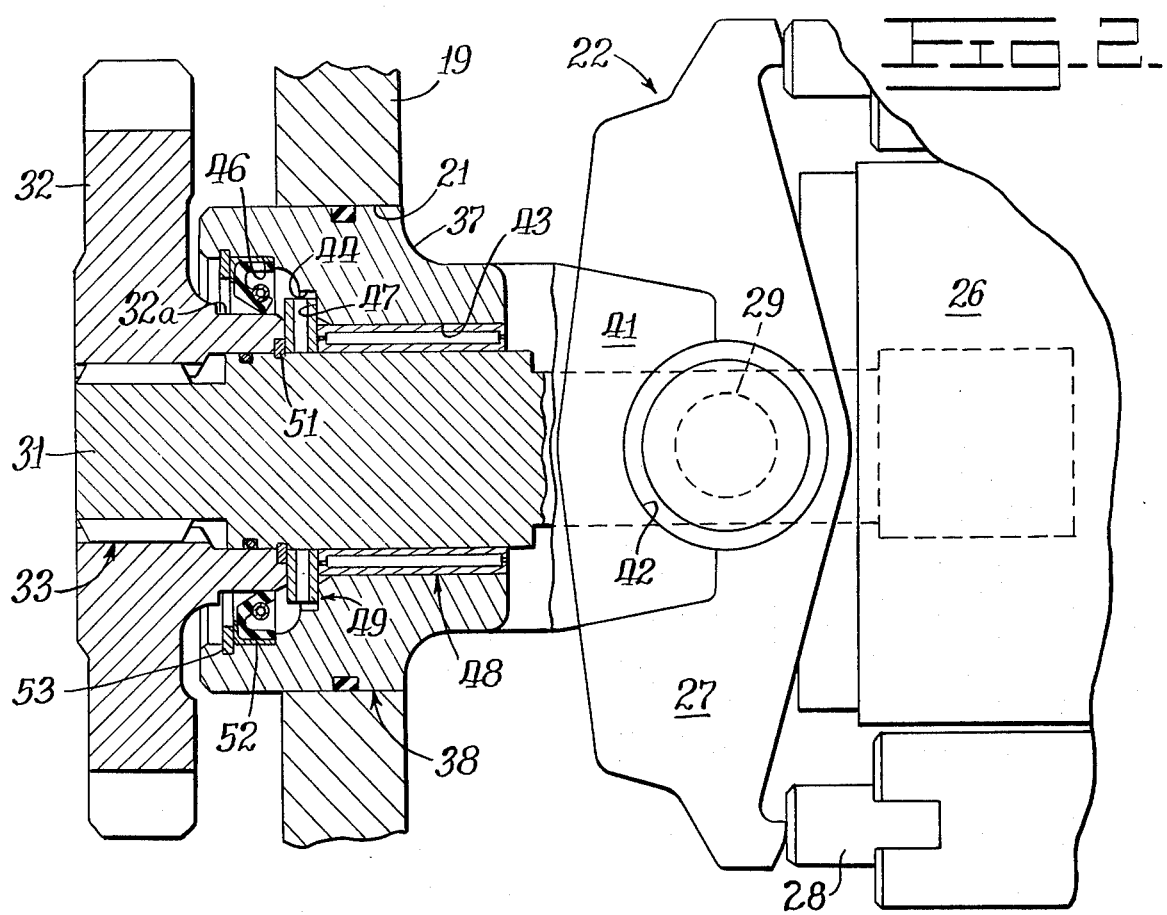
FIG. 2 is an enlarged fragmentary sectional view of the mounting arrangement of FIG. 1.

Referring more particularly to the drawings, a mounting arrangement for a hydraulic motor embodying the principles of the present invention is generally indicated by the reference numeral 10 in association with a wheel support structure 11 of a vehicle, not shown. The wheel support structure includes a hollow spindle 12 having a bore 13 formed therein which has opposite open ends 14 and 16. A wheel rim assembly 17 is rotatably mounted on the hollow spindle by a pair of axially spaced bearings 18. An end plate 19 is secured to the spindle by a plurality of bolts, one of which is shown at 20, forming an end wall closing the end 16 of the bore. The plate has a pilot bore 21 extending therethrough.

A variable displacement hydraulic motor 22 is disposed within the bore 13 of the spindle 12 at its open end 14 and has a radially outwardly extending flange 23 secured to the spindle by a plurality of bolts 24. The hydraulic motor includes a head 25, a rotatable barrel 26, and a pivotal swash plate 27. The angle of the swash plate is controlled by a pair of actuating pistons 28 in the usual manner for controlling the output speed and direction of rotation of the hydraulic motor. A pair of trunnions or stub shafts 29 extend radially outwardly from the swash plate and are disposed diametrically opposite to each other. A pair of bearing assemblies 30 are individually disposed on the trunnions 29. A drive shaft 31 of the hydraulic motor has one end drivingly coupled to the barrel and extends axially therefrom through a central opening in the swash plate. A sun gear 32 is drivingly connected to the distal end of the drive shaft by a spline connection 33. The sun gear is in meshingly driving engagement with a planetary gear arrangement partially shown at 34 which may be selectively coupled to drive the rim assembly 17 through a pressure actuated clutch, not shown.

A mounting bracket 37 has an annular pilot portion 38 received by the pilot bore 21 in the plate 19 with the pilot portion terminating at a pair of diametrically opposed outwardly extending flanges 39 which are in endwise abutting engagement with the plate. A pair of spaced apart lugs 41 extend axially from the peripheral portion of the flanges toward the hydraulic motor. A semicircular recess 42 is provided within each of the lugs and is in nested engagement with the respective bearing assembly 30 on each of the trunnions 29. A plurality of axially spaced coaxial bores 43, 44 and 46 are formed in the mounting bracket concentric with the annular pilot portion 38 with bore 44 forming a radially extending shoulder 47. An antifriction roller bearing 48 is disposed within the bore 43 with the drive shaft 31 extending therethrough and is rotatably supported thereby. A thrust bearing 49 is disposed within the bore 44 in circumscribing relation to the drive shaft and is retained on the drive shaft in abutment with the shoulder 47 by a snap ring 51 to maintain the recesses 42 in engagement with the bearing assemblies 30 on the trunnion 29. An annular seal 52 is retained in the bore 46 by a snap ring 53 and seals against a hub portion 32a of the sun gear 32.

The mounting bracket 37 is fixedly secured to the plate 19 by a plurality of bolts, one of which is shown at 54, individually extending through a plurality of holes 56 formed in the plate. The bolts are individually screw threaded into a plurality of threaded holes 57 in the flanges 39 of the mounting bracket.

OPERATION

Figure 3:
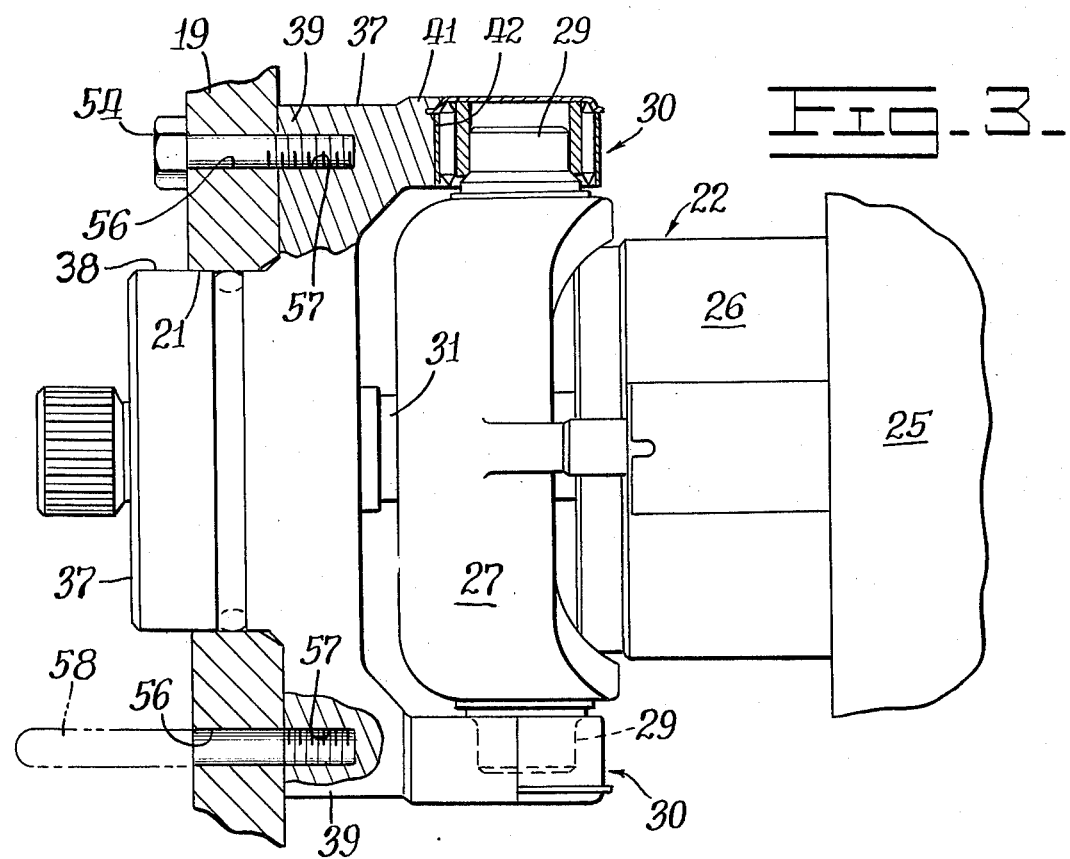
FIG. 3 is a side elevational view of the mounting arrangement of FIG. 2 with portions shown in section for illustrative convenience.

While the operation of the present invention is believed clearly apparent from the foregoing description, further amplification will subsequently be made in the following brief summary of such operation. Prior to inserting the hydraulic motor 22 into the bore 13, the mounting bracket 37, bearing 48, thrust bearing 49 and seal 52 are bench assembled to the hydraulic motor as a subassembly with the components being retained on the drive shaft 31 by the snap ring 51. A pair of guide rods, one of which is shown in phantom lines at 58 in FIG. 3 are threaded into a pair of the threaded holes 57 in the flanges 39 and the entire motor subassembly inserted into the bore as a unit. The guide rods are aligned with the appropriate holes 56 and extend therethrough to maintain the subassembly in proper alignment until the pilot portion 38 enters the pilot bore 21 in the plate and the flanges 39 of the mounting bracket are fixedly secured to the plate by some of the mounting bolts 54. The guide rods are then removed and replaced by a pair of the bolts 54. At that stage of the assembly procedure, a portion of the rim assembly 17 and the planetary gear arrangement 34 have not been assembled so that the bolts securing the mounting bracket to the plate are easily installed. The flange 23 of the hydraulic motor is then fastened to the spindle 12 by the bolts 24. With the mounting bracket secured to the plate and the flange of the hydraulic motor bolted to the spindle, the forces tending to separate the swash plate from the barrel of the hydraulic motor are taken directly by the spindle.

In view of the foregoing, it is readily apparent that the structure of the present invention provides an improved mounting arrangement for a hydraulic motor which enables the hydraulic motor and the mounting bracket and related bearings to be bench assembled so that they may be easily installed as a unit. The subassembly is held together by a snap ring while the unit is being fastened to the spindle. It is apparent that very little additional machining is required to the wheel support structure components for preparing them to accept the motor subassembly. Thus it is economically acceptable to utilize the same basic components on vehicles with or without the auxiliary drive hydraulic motor thereby simplifying manufacturing procedures and reducing the inventory of replacement parts.

While the invention has been described and shown with particular reference to the preferred embodiment, it will be apparent that variations might be possible that would fall within the scope of the present invention which is not intended to be limited except as defined in the following claims.

What is claimed is:

1. A mounting arrangement for a variable displacement hydraulic motor having a pivotal swash plate and an axially extending drive shaft, comprising:
   a hollow support structure having a bore formed therein with said bore having an open end for receiving the hydraulic motor;
   an end wall secured to said support structure at an opposite end of said bore and having a pilot bore extending therethrough;
   a mounting bracket journalled to said drive shaft and having a pair of spaced apart lugs extending toward the hydraulic motor and pivotally engaging the swash plate, and an annular pilot portion disposed coaxial with said drive shaft and piloted into said pilot bore; and
   means for securing said mounting bracket to said end wall.

2. The mounting arrangement of claim 1 including a pair of trunnions extending radially outwardly from the swash plate of the hydraulic motor and wherein each of said lugs of said mounting bracket have an arcuate recess in nested pivotal engagement with one of said trunnions.

3. The mounting arrangement of claim 1 wherein said mounting bracket has a first bore extending therethrough coaxial with said pilot portion and including antifriction bearing means disposed within said bore journalling the drive shaft to said mounting bracket.

4. A mounting arrangement for a variable displacement hydraulic motor having a pivotal swash plate and an axially extending drive shaft, comprising: a hollow support structure having a bore formed therein with said bore having an open end for receiving the hydraulic motor; an end wall secured to said support structure at an opposite end of said bore and having a pilot bore extending therethrough; a mounting bracket journalled to said drive shaft and having a pair of spaced apart lugs extending toward the hydraulic motor and pivotally engaging the swash plate, an annular pilot portion disposed coaxial with said drive shaft and piloted into said pilot bore, a first bore extending therethrough coaxial with the pilot portion, and a second bore formed therein concentric with said first bore and which forms a radially extending shoulder; means for securing said mounting bracket to said end wall; antifriction bearing means disposed within the first bore journalling the drive shaft of the hydraulic motor to said mounting bracket; a thrust bearing disposed in said second bore in engagement with said shoulder; and a snap ring retaining said thrust bearing, said bearing means, and said mounting bracket on said drive shaft so that said mounting bracket, bearing means and thrust bearing may be preassembled onto the drive shaft of the hydraulic motor for subsequent insertion into the support structure and attachment to the end wall as a unit.

5. A mounting assembly for attaching a hydraulic motor to a hollow support structure having an open end spaced from an end wall with the end wall having a pilot bore extending therethrough, comprising:
   a variable displacement hydraulic motor adapted for insertion into the open end of the hollow support structure, said motor having a pivotal swash plate, an axially extending drive shaft, and an outwardly extending flange for attachment to the hollow support member;
   a mounting bracket journalled to said drive shaft and including a pair of spaced apart projections extending toward said motor and pivotally engaging the swash plate, and an annular pilot portion disposed coaxial with the drive shaft for piloting into the pilot bore; and
   means for securing said mounting bracket to the end wall.

6. The mounting assembly of claim 5 wherein said swash plate includes a pair of trunnions extending radially outwardly therefrom and wherein each of said projections of said mounting bracket has an arcuate recess disposed in nested pivotal engagement with one of said trunnions.

7. A mounting arrangement for a hydraulic motor comprising:
   a hollow wheel support having a bore extending therethrough, said bore having a pair of open ends;
   an end plate secured to said support member in closing relation to one of said ends of said bore and having a pilot bore extending therethrough coaxial with said bore in said support member;
   a variable displacement hydraulic motor extending into said bore in said support member from the other of said ends and including a flange removably secured to said support member, a swash plate having a pair of outwardly extending diametrically opposite trunnions, and an axially extending drive shaft extending through said pilot bore;

a mounting bracket having an annular pilot portion piloted within said pilot bore, a flange extending radially outwardly from said pilot portion and disposed in abutment with and fixedly secured to said end plate, said flange having a pair of diametrically opposite lugs extending axially toward said hydraulic motor with each lug having an arcuate recess receiving one of said trunnions, said mounting bracket including a bore extending therethrough coaxial with said pilot bore;

bearing means disposed within said bore of said mounting bracket for journalling said drive shaft to said bracket;

retaining means for retaining said bearing means and said mounting bracket on said drive shaft so that said mounting bracket and said bearing means may be preassembled on said drive shaft of said hydraulic motor and the preassembled unit inserted into the bore of said support member as a subassembly.

8. A mounting assembly for attaching a hydraulic motor to a hollow support structure having an open end spaced from an end wall with the end wall having a pilot bore extending therethrough, comprising:

a variable displacement hydraulic motor adapted for insertion into the open end of the hollow support structure, said motor having a pivotal swash plate, an axially extending drive shaft, and an outwardly extending flange for attachment to the hollow support member;

a mounting bracket journalled to said drive shaft and having an annular pilot portion disposed coaxial with the drive shaft for piloting into the pilot bore, a first bore extending therethrough coaxial with the pilot portion, and a second bore formed therein concentric with said first bore and which forms a radially extending shoulder;

means for securing said mounting bracket to the end wall;

anti-friction bearing means disposed within the first bore journalling the drive shaft of the variable displacement hydraulic motor to the mounting bracket;

a thrust bearing disposed in said second bore in engagement with said shoulder; and a snap ring retaining said thrust bearing, said bearing means and said mounting bracket on said drive shaft so that said mounting bracket, bearing means and thrust bearing may be preassembled onto the drive shaft of the variable displacement hydraulic motor for subsequent insertion into the support structure and attachment to the end wall as a unit.

* * * * *